Jan. 12, 1965  F. K. H. NALLINGER  3,165,161
DRIVE AND AXLE SUSPENSION FOR MOTOR VEHICLES
Original Filed Sept. 30, 1949  4 Sheets-Sheet 1
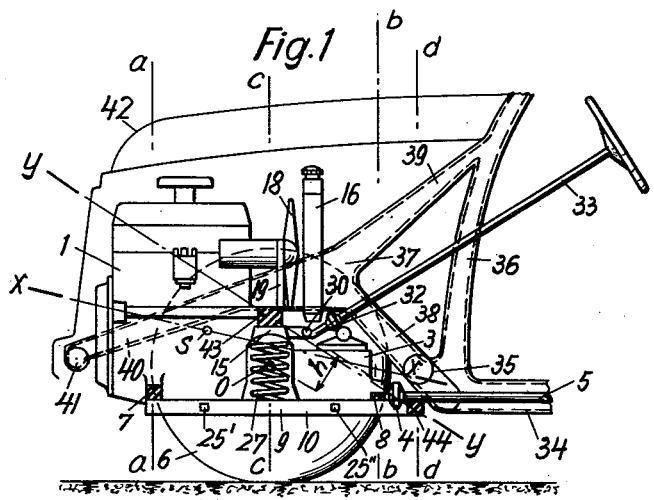
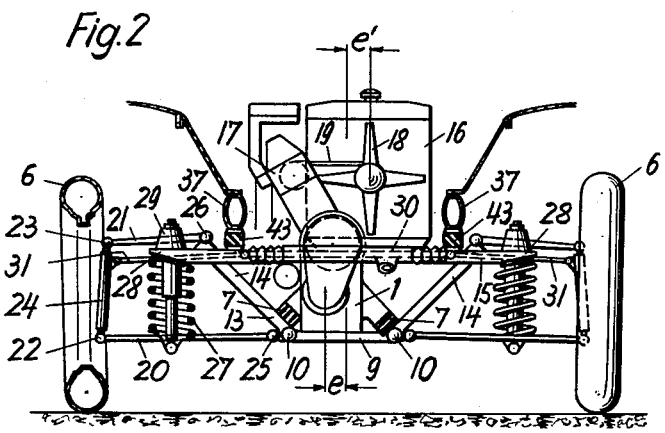
FRIEDRICH K. H. NALLINGER
BY Dicke and Craig
ATTORNEYS.

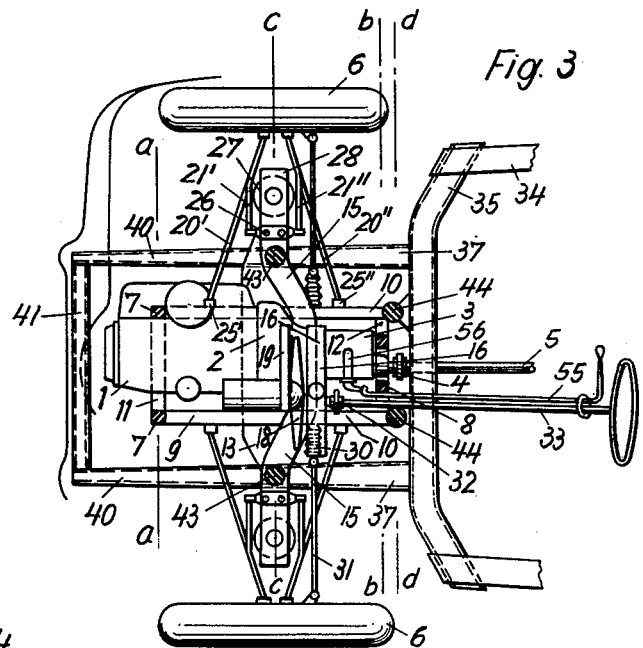
Fig. 3
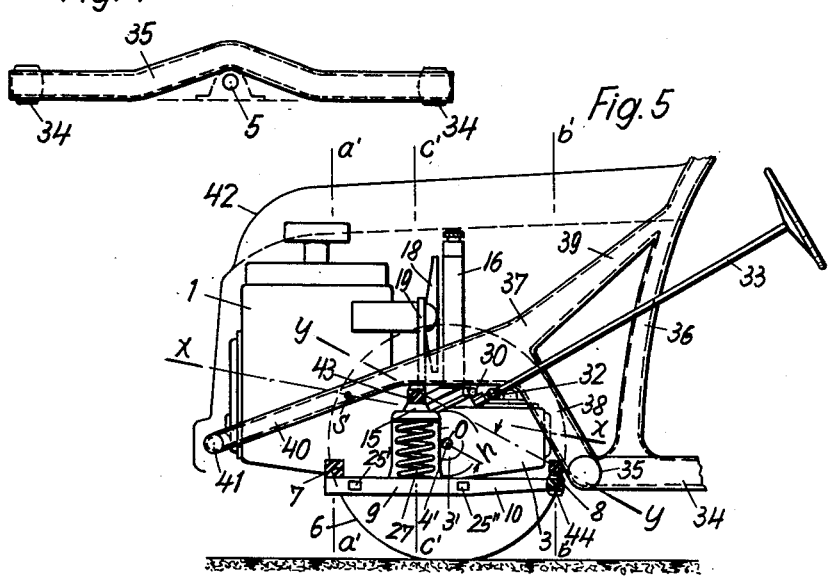
Fig. 4
Fig. 5

Jan. 12, 1965    F. K. H. NALLINGER    3,165,161
DRIVE AND AXLE SUSPENSION FOR MOTOR VEHICLES
Original Filed Sept. 30, 1949    4 Sheets-Sheet 3
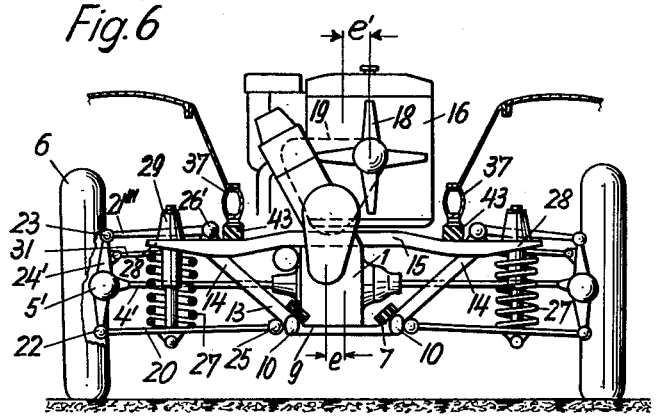
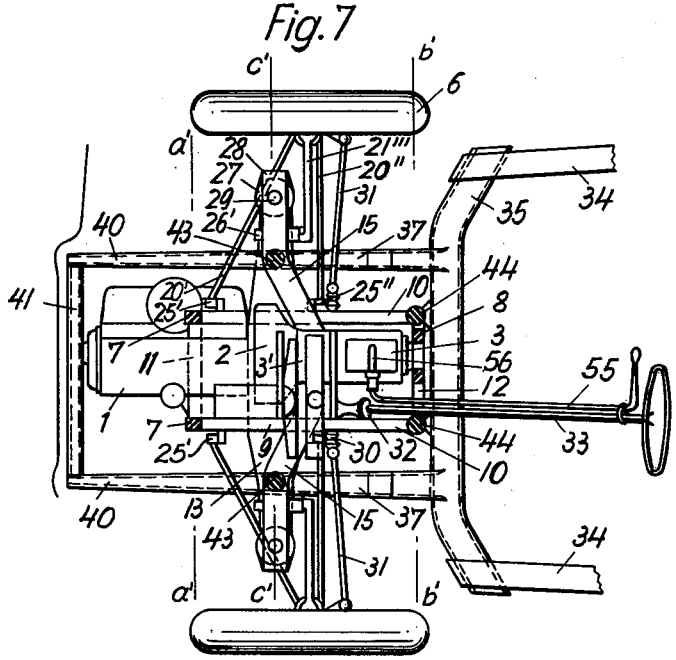
FRIEDRICH K. H. NALLINGER
BY Dicke and Craig
ATTORNEYS.

Jan. 12, 1965     F. K. H. NALLINGER     3,165,161
DRIVE AND AXLE SUSPENSION FOR MOTOR VEHICLES
Original Filed Sept. 30, 1949     4 Sheets-Sheet 4
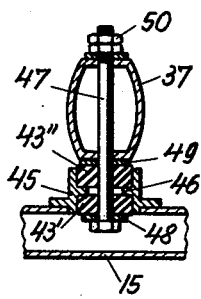
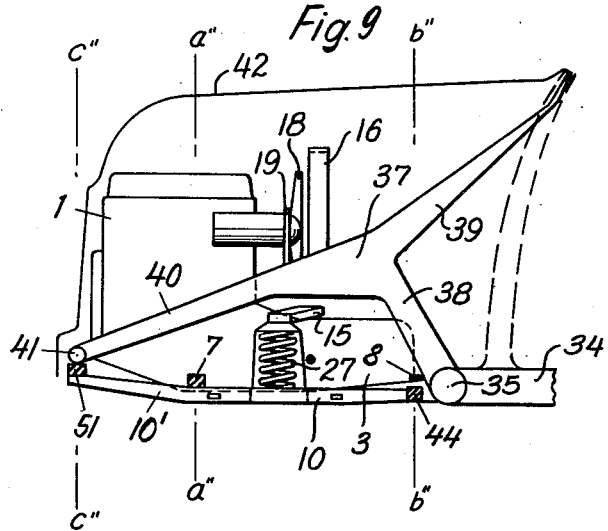
FRIEDRICH K. H. NALLINGER
BY *Dicke and Craig.*
ATTORNEYS.

United States Patent Office 3,165,161
Patented Jan. 12, 1965

3,165,161
DRIVE AND AXLE SUSPENSION FOR
MOTOR VEHICLES
Friedrich K. H. Nallinger, Albrecht-Duerer-Weg 5,
Stuttgart, Germany
Continuation of abandoned application Ser. No. 446,355,
July 28, 1954, which is a continuation of abandoned
application Ser. No. 118,735, Sept. 30, 1949. This
application Jan. 23, 1961, Ser. No. 84,458
Claims priority, application Germany Oct. 1, 1948
20 Claims. (Cl. 180—12)

The present application is a continuation of my co-pending application Serial No. 446,355, filed July 28, 1954, now abandoned, which was a continuation of an application co-pending therewith, namely Serial No. 118,735, filed on September 30, 1949, now abandoned, entitled Drive and Axle Suspension for Motor Vehicles.

The present invention relates to a motor vehicle and more particularly to a vehicle in which a drive unit, preferably together with an axle unit, is mounted on an auxiliary frame which together with the aforementioned units may be mounted as a single unit on the vehicle body or superstructure.

Accordingly, it is a primary object of the present invention to facilitate the manufacture and assembly of motor vehicles.

Another object of the present invention is to provide a noiseless, safe and reliable support for the power-unit, as well as an improvement in the riding properties of the motor vehicle.

Another object of the present invention resides in the improved suspension of the drive unit from the vehicle body by the use of an auxiliary frame as an intermediary member for the elastic suspension.

Consequently it is a characteristic of the present invention to provide an elastic connection of the drive aggregate with the auxiliary frame, on the one hand, and of the auxiliary frame with the vehicle, on the other. Because of the double elasticity resulting from such connection it is possible to obtain a practically complete insulation of the forces and noise sources from one another. The auxiliary frame, under those conditions, acts as an intermediate damping mass suspended between the motor and the vehicle body. Especially in the case of a self-supporting steel body, the jarring of the steel body caused partially by the motor and partially by the road can practically be eliminated. Furthermore, the motor may swing freely by itself whereby shocks and forces may be kept from the auxiliary frame, the vehicle parts and the vehicle body.

A further object of the present invention relates to a suitable arrangement of the elastic member for journalling or supporting the drive aggregate on the auxiliary frame, on the one hand, and for elastically connecting the auxiliary frame with the vehicle body, on the other, and especially in such a manner that in spite of a stable suspension of the drive aggregate and in spite of a stable mounting of the vehicle body or superstructure on the auxiliary frame a sufficiently soft transverse spring-suspension of the vehicle may be achieved. This may be attained because the transverse forces originating in the wheels act with a lever arm with respect to the connecting points between the auxiliary frame and the vehicle body and thereby enable a slight motion of the auxiliary frame around a horizontal or inclined longitudinal axis.

Still another object of the present invention is to provide a mounting of the aggregates on the auxiliary frame so that a simplified assembly of the auxiliary frame and aggregates as a single unit with the vehicle body is rendered possible.

A still further object of the present invention is to provide a particular arrangement of parts in relation to each other whereby the vehicle body or superstructure may be placed and mounted without obstruction from above on the sub-assembly consisting of the auxiliary frame and the aggregates including, for example, drive and axle units connected thereto.

Another object of the present invention relates to the provision of a rigid and as appropriate as possible a construction of the auxiliary frame or of the vehicle body or superstructure which houses the auxiliary frame and aggregate.

An additional object of the present invention is to provide a construction which permits series production of vehicles at low cost in that, by interchanging vehicle body parts, the auxiliary frame unit may be used for different types of vehicles and for different purposes.

A further object of the present invention relates to the construction of vehicle parts in connection with an auxiliary frame for a vehicle so that the center of gravity of the vehicle is located as low as possible.

Accordingly, a primary feature of the present invention resides in an arrangement of the drive in which the power-unit, together with the axle and wheels, are detachably connected as one unit to the vehicle-superstructure, i.e., either to a vehicle frame or preferably to a self-supporting vehicle body, while the connection of the power-unit with the vehicle-superstructure is provided for in such a manner that the latter may be placed over the power-unit in a hood-like manner and then be attached thereto.

Another object of the present invention lies in the fact that the vehicle-superstructure, especially if developed as self-supporting body, is provided with a frame-like supporting structure which is supported in a strut-like manner against the upper part of the vehicle-superstructure, and that the power-unit is detachably connected with this frame-like supporting structure in such a manner that it may be wheeled away as one entirety like a truck or bogie.

It is still another object of the present invention to provide an arrangement wherein the power unit, including in particular the axle of the wheels, wheels and springs, if so desired also the wheel drive and the wheel steering etc., are supported on an auxiliary frame which together with the power-unit is fastened to the vehicle-superstructure.

The present invention is equally applicable to vehicles with rear wheel drive or front wheel drive or, for example, four wheel drive, whereby the engine respectively the power-unit may be arranged either on the driven or non-driven axle.

A still further object of the present invention is to permit the sub-assembly into one unit of all driving members and axle parts necessary for operation, insofar as they are within the area of the respective axle, independently of the vehicle frame or the vehicle body so as to be readily mounted in the manner of a truck or bogie standing on its own wheels, while at the same time permitting to retain the closed and continuous outer shape of the vehicle and to enhance the structural strength of the vehicle. Joints susceptible to influences of weather, climate and other factors which may likewise interfere with the smooth outside appearance of the body, for example, of a body constructed according to the so-called cellular method, are obviated by the use of a body which covers and protects the power-unit, truck or bogie in a hood-like fashion. Furthermore, by the use of a strut-like supporting construction, a unitary arrangement is produced between the power-unit or truck, on the one hand, and the vehicle frame or vehicle body, on the other hand with respect to absorption of forces and construction notwithstanding the separate manufacture of the power unit and truck or bogie, which owing to favorable tensile stresses permits an altogether light-weight construction.

Furthermore, it is of great economic significance that production of motor vehicles for various purposes, as, for example, passenger cars, such as a 2, 3, 4-seaters, etc., trucks, delivery wagons or ambulances, is rendered possible in the present invention by the use of the same drive-chassis unit, since the latter may be interchangeably incorporated in vehicle-superstructures of any kind. In the construction of the vehicle body, be it for passenger cars or be it for trucks, it is not necessary to take into consideration the drive as long as all the parts of the drive as, for example, in a front wheel drive or rear engine drive, are incorporated in the detachable drive-chassis unit which may be located, in the case of a front wheel drive, for example, in front of the front panel of the vehicle body or the driver's cab.

It is accordingly a still further object of the present invention to make available the greatest possible space for useful loads. In passenger cars, a low floor without central tunnel for the drive may be obtained thereby. The present invention is thus of very great significance for the series production of small motor vehicles with greatest economy and efficiency, but may also be employed to advantage in the production of larger vehicles.

A further feature and advantage of the present invention consists in that with the use of auxiliary frames, by which are also understood simple auxiliary girders which carry the power-unit and preferably also the axle of the wheels, the power unit is elastically supported on the auxiliary frame and the latter is elastically attached to the vehicle-superstructure.

Another object of the present invenetion resides in the construction of a motor vehicle, wherein the auxiliary frame is effective as a deadening or damping mass elastically interposed between engine and vehicle body. In particular, the resounding of the vehicle body, especially of all-steel bodies, partially resulting from the engine and partially from the road bed may be suppressed practically completely.

According to another feature of the present invention the engine may freely swing by itself, thereby keeping shocks and stresses off the vehicle-superstructure. In this connection, by way of example, the power-unit, in particular comprising the engine, the change speed gear and, for example, also the axle gear, may be supported in rubber cushions on the auxiliary frame in such a manner that an axis of oscillation extending substantially through the center of gravity of the power-unit in the longitudinal direction of the vehicle results for the power-unit, while the auxiliary frame, which supports in particular the wheel guide and axle springs in addition to and independently of the power unit, is suitably connected with the vehicle-superstructure by, for example, medium hard rubber cushions in such a manner that the yieldingness in the rubber cushions is greater in the perpendicular direction than in the horizontal direction. It is appropriate that the yieldingness between power-unit and auxiliary frame is greater than between the latter and the vehicle-superstructure. On the other hand, the power-unit, especially in consideration of the operation of clutch and gear shift, is suitably supported with as little yieldingness as possible in the longitudinal direction, possibly even rigidly against the vehicle frame or vehicle body.

Furthermore, it is especially advantageous to pass the plane of the elastic suspension of the auxiliary frame on the vehicle superstructure at a certain greater distance from those places from which the shocks coming from the road bed or wheels are transmitted to the auxiliary frame, for example, above the knuckles of guide links or swinging half axles or also through the knuckles of the upper one of every two guide links arranged one above the other.

In all of these cases there then ensues a lever arm with relation to the guide links or with relation to the lower pair of guide links which lever arm, in connection with shocks and forces resulting from the wheels, tries to effect a tilting or a turning of the auxiliary frame about a horizontal or oblique longitudinal axis.

In spite of a stable support of the superstructure on the auxiliary frame or wheel chassis, a sufficiently pliable or flexible transverse springiness of the vehicle is thereby obtained, since the transverse shocks are transformed into perpendiclar motions of the rubber parts with respect to each other.

Moreover the present invention relates above all to an especially suitable arrangement and development of the power-unit so as to be detachable from the vehicle-superstructure as a unit to the particular organization of the elastic support of the auxiliary frame, to an advantageous construction of the latter and the strut-like supporting structure of the vehicle-superstructure, to an advantageous arrangement of the wheel guide and wheel springs in relation to these constructions, and also to a particular useful arrangement of the radiator and other vehicle parts.

The various objects as well as other advantages and features of the present invention will become more obvious from the following detailed description when taken together with the accompanying drawing which shows for purposes of illustration only several preferred embodiments of the present invention, and wherein:

FIGURE 1 is a side elevational view of the front part of a motor vehicle with the engine located ahead of the front wheels and provided with driven rear wheels in accordance with the present invention.

FIGURE 2 is a front elevational and sectional view of FIGURE 1.

FIGURE 3 is a top view of FIGURE 1.

FIGURE 4 is a component part of the arrangement according to FIGURES 1 to 3.

FIGURE 5 is a side elevational view corresponding to FIGURE 1 for a vehicle with front wheel drive in accordance with the present invention.

FIGURE 6 is a front elevational view corresponding to FIGURE 2 of the arrangement shown in FIGURE 5.

FIGURE 7 is a top view corresponding to FIGURE 3 of the arrangement shown in FIGURE 5.

FIGURE 8 is a detailed view of an elastic suspension shown in FIGURES 1, 2 and 3, and FIGURE 9 is a modification of the arrangement of the auxiliary frame 9 shown in FIGURES 1, 2 and 3.

Referring now to the drawing wherein like reference numerals are used throughout the various views to designate like parts, and more particularly to FIGURES 1, 2 and 3, which show the power-unit which consists essentially of engine 1 arranged in front of the center of the front axle, of flywheel-clutch case 2 and of change speed gear 3 arranged behind the front axle or center of the front wheels. It is thereby advisable that the flywheel-clutch case be located approximately near the center of the front axle. The crankshaft and the main gear shaft are arranged at about the height of the center of the front axle, while the secondary shaft of the gear and the driving shaft 5, leading to the rear wheels and arranged in the extension of the secondary shaft and coupled therewith by shaft coupling 4, are located below the center of the wheels.

The power-unit is elastically supported on the auxiliary frame 9 by means of two front rubber cushions 7 inclined with respect to each other and located in a first transverse plane $a$—$a$ (FIGURES 1 and 3) and by means of similarly arranged rear rubber cushions 8 located in a second transverse plane $b$—$b$ (FIGURES 1 and 3) located to the rear of the first plane $a$—$a$. The amount of inclination and the size of the rubber cushions 7 and 8 respectively which, by way of example, are united with the steel parts by vulcanization and which in each case, in particular with cushion 8, may also be exchanged for a single arched rubber cushion of corresponding radius, are thereby so chosen that a natural axis of oscillation $x$—$x$ arises for the power-unit with respect to the auxiliary frame 9 which axis of oscillation extends either approximately horizontally through the center of gravity S of the power-unit or, preferably, for example, at an angle to the horizontal with a downward inclination towards the axle gear in the longitudinal direction of the vehicle. The engine accordingly is able to yield without vibrations to the alternating inner torsional forces thereof.

The auxiliary frame consists of the two longitudinal beams or girders 10 located below the power-unit and at both sides of the same. The longitudinal girders 10 are connected to each other at their ends by transverse beams or girders 11 and 12. The longitudinal girders or also the front transverse girder 11 thereby serve as support for the power-unit by means of rubber cushions 7, while the rear girder 12 serves for the support of the power-unit by means of rubber cushions 8. The longitudinal transverse girders are constructed as hollow girders of either round or box-like section. The auxiliary frame is further stiffened by a transvere girder 13 which extends in an approximately U-like form and which in its middle section, where it extends below the power-unit, connects together both longitudinal girders 10 of the auxiliary frame. The ends or legs 14 of the U-shaped transverse girder 13, which protrude obliquely and upwardly beyond the longitudinal girders 10, are stiffened by a transverse supporting member 15 extending higher than and outwardly beyond the gear and to which supporting member 15 the ends 14, for example, are either screwed or welded. The radiator 16 is supported on the transverse supporting member 15 either rigidly or by means of interposed elastic members in such a way that, in relation to the direction of travel, it is located behind the engine 1. In order to assure free access of cooling air to the radiator, the engine is eccentrically disposed by an amount $e$ with respect to the central longitudinal plane of the vehicle and has inclined cylinders 17, as shown particularly clearly in FIGURE 2.

The radiator is likewise disposed eccentrically, though in the opposite direction as the engine 1, by an amount $e'$ with respect to the central longitudinal plane of the vehicle. A fan 18 is, for example, driven by the camshaft by means of a belt-drive 19 or the like, which at the same time may serve as drive for the generator or other aggregates. The camshaft may be suitably driven by a chain drive which is arranged at the front end of the crankshaft and which is driven thereby. The battery for the starting, lighting and ignition system of the vehicle may also be arranged on the auxiliary frame or on the power-unit as, for example, next to the engine.

Each of the wheels 6 is guided by a longer lower guide link 20 and by a shorter upper control link 21 which are attached to the steering swivel journal 24 of the wheel by means of knuckles 22 and 23, respectively. The lower guide link 20 of each suspension consists of two webs 20′ and 20″ which are linked to the longitudinal girders 10 of the auxiliary frame at 25, 25′ and 25″ respectively. The upper guide or control links 21, which consist of two webs 21′ and 21″, are linked by pins 26 to the ends 14 of the transverse girder 13 and to the transverse supporting member 15 respectively. Each wheel 6 is provided with a helical spring 27 arranged in the vertical transverse plane extending through the center of the wheels which spring supports itself, on the one hand, against the lower guide link 20, for example, by means of a spring disk rigidly or articulately arranged between the webs 20′ and 20″ on a transverse web, and, on the other hand, against the pedestal-like end 28 of the transverse girders 13, 14 or transverse supporting member 15.

The steering system for the wheels which is, for example, arranged also on the auxiliary frame 9, is in the present instance developed as rack steering gear. The rack 30 of the steering gear, which is actuated by a pinion on the shaft of the steering column 33, is supported on the transverse supporting member 15. Steering motion is transmitted to the front wheels 6 by means of spacer bars or tie-rods 31 and steering levers which are attached to steering swivel journals 24. The steering gear is attached to the steering column 33 by means of a disconnectible coupling 32. The steering column 33 is supported on the vehicle body and, at the same time, carries the gear shift 45 for the change speed gear which is operated by gear shift lever 46 which may be disengageably connected thereto.

The vehicle-superstructure is developed as a self-supporting body. It contains, for example, lower hollow girders 34 which delimit the body laterally and are connected together by a hollow front girder 35 in front of the driver's seat. The door posts 36, which may be also of suitable hollow construction, extend upwardly from the junction of the two hollow girders 34 and 35. A frame-like front extension of the body which is braced to the lower and upper part of the body serves as supporting structure for the drive-chassis unit which is carried by the auxiliary frame 9. The frame-like supporting structure essentially consists of two lateral girders 37 which are only about half the distance apart from each other as the hollow girders 34 and are each formed by two braces 38 and 39 converging towards the front in a V-shaped manner, by extensions 40, and by a front transverse member 41. The particularly sturdy hollow brace 38 is thereby attached to the lower transverse girder 35 of the vehicle body, for example, by means of welding, whereas the upper oblique brace 39 is attached in a corresponding manner to the front section of the vehicle body. The front transverse member 41 may also serve as bumper of the car or may carry a bumper and likewise the license plate or the like. The engine hood 42 may also be connected with the vehicle body or the supporting structure.

The entire drive and axle unit, i.e., the parts designated by reference numerals 1–4 and 6–32, may now be assembled as one self-contained unit which is movable on wheels in the manner of a truck or bogie and which is attached to the supporting structure of the vehicle superstructure in the following readily-detachable manner:

The auxiliary frame 9 and the supporting structure are elastically connected together at four points, namely at the two front points 43 located in a third transverse plane $c$—$c$ and the two rear points 44 located in a fourth transverse plane $d$—$d$. The rubber cushions 43 are thereby located at those places of intersections where the girders 37 of the vehicle-superstructure and the transverse supporting member 15 cross each other; the rubber cushions 44 are located at the rear ends of the auxiliary frame between the latter and the hollow transverse girder 35 of the vehicle body. The mounting cushions 43 which carry the greater portion of the distributed load of the vehicle body are attached to the bridge-like structure comprising member 15 substantially in a horizontal plane which passes through the power unit center of gravity S. The points 43, in accordance with the construction of the present invention, are thereby located as far as possible from one another in order to provide the auxiliary frame with a broad and stable supporting base with respect to the vehicle-superstructure, whereas the rear points 44 lie closer together and, if so desired, may also be united into one single point so that a three-point support of the auxiliary frame on the vehicle-superstructure is formed. The plane $y$—$y$, indicated in FIGURE 1, which passes through the rubber cushions or buffers 43 and 44 generally parallel to the front wheel axis, thereby extends, owing to the elevated position of the rubber cushions 43, above the center of gravity S of the power-unit and also above the center O of the front axle and at a distance $h$ from the latter. Shocks or forces which act in a direction transverse to the direction of travel in the center of the axle, therefore, exert a tilting moment on the auxiliary frame which attempts to turn the latter about a longitudinal axis and subjects the rubber cushions 43 and/or 44 to a stress in the vertical direction. The rubber cushions 43 and 44 are suitably formed in such a manner that they possess a yieldingness mainly in the vertical direction while being relatively rigid in the horizontal direction. This arrangement of the rubber cushions together with the lever arm h brings about that with good transverse stability of the vehicle-superstructure nevertheless a sufficiently soft yieldingness against lateral shocks or bumps is assured.

The rubber cushions 43, as is especially evident from FIGURE 2, are located in the present embodiment substantially at the height of the knuckles 26 of the upper guide links 21 and directly alongside these knuckles so that they lie in the plane of suspension y—y of the auxiliary frame. Transverse forces, which are transmitted to the auxiliary frame by way of the links 21, therefore, do not exert any tilting moment on the auxiliary frame. On the other hand, a far greater tilting moment or torque about an axis of rotation lying in the plane y—y and extending in the longitudinal direction of the vehicle may be exerted by the forces which are transmitted from the wheels to the auxiliary frame by way of the lower links 20.

The rubber cushions 43 and 44, which may also be constituted by pairs one above the other, are suitably inserted into shells with pre-tension and, for example, pressed axially against the shell, for example, from both sides against a middle shoulder of the same, by a bolt extending through the rubber cushion. The bolt, at the same time, may serve the purpose of establishing the connection between auxiliary frame and vehicle-superstructure. The shell, enclosing the rubber cushions, may be welded to the auxiliary frame, for example, to the transverse supporting member 15, or may be fastened thereto in some other way, while the bolt for fastening the auxiliary frame to the vehicle-superstructure may be inserted, for example, without metallic connection through a hole in the girder 37 and be secured by a nut or the like with simultaneous pre-tensioning of the rubber, as will be described more fully with reference to FIGURE 8.

The assembly of the truck or bogie, comprising the power-unit and axle-unit, with the vehicle-superstructure takes place in such a way that the latter together with the supporting structure 37 to 41, consisting essentially of the two strut-like girders 37, and the engine hood 42 is placed over the power-unit from above in the manner of a hood, whereupon the fastening is then accomplished by inserting and securing the fastening bolts, or in some other suitable way. Furthermore, the steering column is connected with the steering gear by means of coupling 32, the gear shift rod 55 is coupled with the gear shift lever 56, the drive shaft 5 is connected to the change speed gear 2 by means of coupling 4 as far as necessary, brake and coupling rods and electrical cables, etc., are thereupon connected.

All the parts of the truck or bogie subassembly, which are located above the girders 37, in particular the engine with cylinders 17 and accessories and also the radiator 16, are arranged in such a way that, as seen in a plan view, they do not protrude laterally beyond the girders 37 so that the vehicle body together with the girders 37 and engine hood 42 may be lowered on the subassembly from above.

If desired, the longitudinal supports 9 and 10 of the auxiliary frame may be extended beyond points 43 and 44 so as to be supported on transverse girder 41 which rests on the front ends of girders 40 of the supporting structure 37, as will be more fully described with reference to FIGURE 9.

FIGURES 5 to 7 show how the present invention is applicable in the same manner also to front wheel drives. In contradistinction to the hereinbefore-described embodiment, the axle gear 3' which is, for example, driven by the secondary shaft of the change speed gear through a hypoid bevel gear transmission, is interposed between clutch case 2 and change speed gear 3. The crankshaft and the transmission shaft in this case cross the axle gear above the wheel centers. The drive for the wheels is transmitted by shafts 4' and knuckles 5' which at the same time permit steering of the wheels. Moreover, the helical spring 27, as can be seen in particular in FIGURES 5 and 7, is displaced forward of or from the axle center of the wheels in order to provide access for the drive shafts 4' to the wheels. The upper guide links 21''' in each case are of single-web construction and are supported by means of journals 23 on wheel carrier 24' and by means of journals 26' on the ends of the transverse girder 15 which are displaced from the center of the axle as seen in FIGURE 7. The rubber cushions 7 are again located in a first transverse plane a'—a' while the rubber cushions 8 are located in a second transverse plane b'—b' and the rubber cushions 43 are located in a third transverse plane c'—c'. The rubber cushions 44 are located in a transverse plane that approximately coincides with the second transverse plane b'—b' as may be seen from FIGURES 5 and 7. In this embodiment of the invention, the entire drive is assembled as one complete unit on the removable truck or bogie so that a disconnection or interruption of the drive itself is not required when detaching the bogie subassembly from the vehicle superstructure. The same would, by way of example, also hold true in the case of a rear engine arrangement with rear wheel drive.

One preferred embodiment illustrating the details of the suspension of the auxiliary frame from the vehicle body or superstructure, for example, in connection with the rubber buffers 43, is shown in FIGURE 8 of the drawing. The upper transverse beam or girder 15 is provided for that purpose with a hub-like part 45 welded thereto and having a central collar or circular flange 46. Rubber buffers 43' and 43'' are inserted on both sides of collar or flange 46. The rubber buffers or cushions 43' and 43'' are traversed by a vertical bolt 47 which simultaneously extends through the longitudinal beam or girder 37 of the vehicle body or superstructure. Rubber buffers 43' and 43'' are wedged between discs 48 and 49 upon tightening the nut 50.

In the illustrative embodiment according to FIGURE 9, the longitudinal beams or girders 10 of the auxiliary frame are extended to the front transverse beam 41 of the vehicle body as indicated at 10' and are attached thereto by the insertion of intermediate rubber buffers 51 in a similar manner as shown in FIGURE 8. Consequently, the auxiliary frame is elastically connected to the vehicle body or superstructure in the four rubber bearings or cushions 44 and 51. The elastic cushions 7 are again located in a first transverse plane a''—a'' (FIGURE 9) while a second transverse plane b''—b'' contains the rubber cushions 8 as well as also the rubber cushions 44; the rubber cushions 51 are located in a third transverse plane c''—c''.

Moreover, the double elasticity between power-unit and auxiliary frame, on the one hand, and between the latter and the vehicle-superstructure, on the other, is also applicable to other vehicle constructions in which the entire drive and axle unit cannot be detached from the vehicle superstructure as a single unit.

It will be obvious to those skilled in the art that the details of construction may be varied within the scope of the present invention from those shown by me while the essentials of the present invention are retained and I, therefore, do not limit myself to such details, except as defined by the appended claims.

I claim:

1. A motor vehicle comprising a vehicle superstructure, a pair of vehicle wheels, an auxiliary frame at one end of the vehicle within the region of the said vehicle wheels separate from said vehicle superstructure, said auxiliary frame consisting of a lower frame part lying lower than the center of said wheels, an upper frame part including a transverse bearer member lying in a transverse vertical plane containing the center axis of said wheels and located above the center of the wheels, and frame members connecting said two frame parts, means for guiding said wheels relative to said auxiliary frame substantially on both sides of said transverse vertical plane, spring means for supporting said wheels on said auxiliary frame, said spring means abutting against the underside of said upper transverse bearer member, a brace construction of said vehicle superstructure extending over said auxiliary frame towards the end of said vehicle, elastic means for connecting said auxiliary frame to said vehicle superstructure, a part of said elastic means being arranged between said upper bearer member and said brace construction, and another part being arranged between the end of said lower frame part near the central transverse plane of said vehicle and said vehicle superstructure, a driving unit extending between said lower frame part and said upper frame part of said auxiliary frame and beneath said upper transverse bearer member, and elastic means for elastically supporting said driving unit on said lower frame part of said auxiliary frame.

2. In a suspension system for a motor vehicle of chassisless construction, the combination of a sub-frame for said vehicle, a bridgelike structure forming part of said sub-frame and located transversely thereof, suspension means for road wheels, means in the vertical plane of said bridgelike structure for attaching said suspension means to said sub-frame, a vehicle body, a plurality of pairs of resilient mounting means supporting one end of the vehicle body on said sub-frame and carrying unequal portions of its distributed load, said pairs of mounting means being longitudinally spaced with respect to said vehicle body, those mounting means carrying the greater portion of the distributed load of the vehicle body being attached to said bridgelike structure substantially in the horizontal plane which passes through the center of gravity of the vehicle body, and a power unit supported by said sub-frame and resiliently mounted thereon by means of a plurality of longitudinally spaced mounting means, one end of said power unit being supported thereby on said sub-frame on the opposite side of said suspension attaching means from those mounting means for the vehicle body structure which carry the lesser portion of its distributed load, so that the moment of the power unit on the one side of said suspension means counteracts the moment of the vehicle body on the other side.

3. In a suspension system for a motor vehicle with road wheels the combination of a sub-frame for said vehicle, a bridgelike structure forming part of said sub-frame and located transversely thereof, suspension means for said road wheels, means substantially in the vertical plane of said bridgelike structure for attaching said suspension means to said sub-frame, a vehicle body, a plurality of pairs of resilient mounting means supporting one end of the vehicle body on said sub-frame, said pairs of mounting means being longitudinally spaced with respect to said vehicle body, one pair of said mounting means being attached to said bridgelike structure and another pair of said mounting means being located towards a transverse central vertical plane of the vehicle body, a power unit, means for resiliently supporting said power unit on said sub-frame including a plurality of longitudinally spaced sub-mounting means, one end of said power unit being supported on said sub-frame by some of said last-mentioned mounting means on the side of said suspension means opposite of said another pair of mounting means, so that the moment of the power unit on the one side of said suspension means counteracts the moment of the vehicle body on the other side thereof, said means for resiliently supporting said power unit on said sub-frame being located in part along the side of said power unit in a common transverse plane and in part along a transverse end surface thereof.

4. In a suspension system for a motor vehicle with road wheels the combination of a sub-frame for said vehicle, a bridgelike structure forming part of said sub-frame and located transversely thereof, suspension means for said road wheels, means substantially in the vertical plane of said bridgelike structure for attaching said suspension means to said sub-frame, a vehicle body, a plurality of pairs of resilient mounting means supporting one end of the vehicle body on said sub-frame, said pairs of mounting means being longitudinally spaced with respect to said vehicle body, one pair of said mounting means being attached to said bridgelike structure and another pair of said mounting means being located towards a transverse central vertical plane of the vehicle body, a power unit, means for resiliently supporting said power unit on said sub-frame including a plurality of longitudinally spaced mounting means located at the ends of said sub-frame, and one end of said power unit being supported on said sub-frame by some of said last-mentioned mounting means on the side of said suspension means opposite of said another pair of mounting means, so that the moment of the power unit on the one side of said suspension means counteracts the moment of the vehicle body on the other side thereof.

5. In a suspension system for a motor vehicle with road wheels the combination of a sub-frame for said vehicle, a bridgelike structure forming part of said sub-frame and located transversely thereof, suspensoin means for said road wheels, means substantially in the vertical plane of said bridgelike structure for attaching said suspension means to said sub-frame, a vehicle body, a plurality of pairs of resilient mounting means supporting one end of the vehicle body on said sub-frame, said pairs of mounting means being longitudinally spaced with respect to said vehicle body, one pair of said mounting means being attached to said bridgelike structure and another pair of said mounting means being located towards a transverse central vertical plane of the vehicle body, a power unit, means for resiliently supporting said power unit on said sub-frame including a plurality of longitudinally spaced mounting means, one end of said power unit being supported on said sub-frame by some of said last-mentioned mounting means on the side of said suspension means opposite of said another pair of mounting means, so that the moment of the power unit on the one side of said suspension means counteracts the moment of the vehicle body on the other side thereof.

6. In a suspension system for a motor vehicle with road wheels the combination of a sub-frame for said vehicle, a bridgelike structure forming part of said sub-frame and located transversely thereof, suspension means for said road wheels, means substantially in the vertical plane of said bridgelike structure for attaching said suspension means to said sub-frame, a vehicle body, a plurality of pairs of resilient mounting means supporting one end of the vehicle body on said sub-frame, said pairs of mounting means being longitudinally spaced with respect to said vehicle body, one pair of said mounting means being attached to said bridgelike structure and another pair of said mounting means being located towards a transverse central vertical plane of the vehicle body, a power unit, means for resiliently supporting said power unit on said sub-frame including a plurality of longitudinally spaced mounting means, one end of said power unit being supported on said sub-frame by some of said last-mentioned mounting means on the side of said suspension means opposite of said another pair of mounting means, so that the moment of the power unit on the one side of said suspension means counteracts the moment of the vehicle body on the other side thereof, said sub-frame including a lower sub-frame part located below said power unit, said bridgelike structure being located above said power unit, and two upwardly directed trusslike members connecting said lower part with said bridgelike structure located substantially in the vertical plane of said bridgelike structure.

7. In a suspension system for a motor vehicle with road wheels the combination of a sub-frame for said vehicle, a bridgelike structure forming part of said subframe and located transversely thereof, suspension means for said road wheels, means substantially in the vertical plane of said bridgelike structure for attaching said suspension means to said sub-frame, a vehicle body, a plurality of pairs of resilient mounting means supporting one end of the vehicle body on said sub-frame, said pairs of mounting means being longitudinally spaced with respect to said vehicle body, a power unit, means for resiliently supporting said power unit on said sub-frame including a plurality of longitudinally spaced mounting means, one end of said power unit being supported on said subframe by some of said last-mentioned mounting means on the one side of said suspension means opposite a pair of said first-mentioned mounting means, so that the moment of the power unit on the one side of said suspension means counteracts the moment of the vehicle body on the other side.

8. A motor vehicle comprising a vehicle body, an end part of said body including two longitudinal members spaced apart a distance relatively small with respect to the width of the vehicle and slanting downwardly toward the end of the vehicle, an auxiliary frame adjacent said end part located at least with a portion thereof between said two longitudinal members, said portion being of smaller width than the spacing between said two longitudinal members, a drive unit, elastic means for elastically supporting said unit on the auxiliary frame, two spaced vehicle wheels, link means directed essentially transversely of the vehicle for suspending said wheels from said auxiliary frame, elastic means for elastically attaching said auxiliary frame to said vehicle body, said drive unit being located between said longitudinal members and extending upwardly therebeyond without laterally projecting beyond said longitudinal members whereby said drive unit mounted on said auxiliary frame may be pulled out freely downwardly from between said longitudinal members after loosening said attaching means, said drive unit comprising a motor offset with respect to the central longitudinal plane of the vehicle to one side thereof and having cylinders tilted towards the outside of the vehicle, and a cooler offset to the other side with respect to the central longitudinal plane of the vehicle, the off-sets being limited to confine the width of said drive unit to a distance smaller than the spacing between said longitudinal members.

9. In a motor vehicle the combination comprising a vehicle superstructure, auxiliary frame means including at least one essentially transversely extending portion connecting two angularly disposed portions, a drive unit including an internal combustion engine and change speed gear means, first elastic means for elastically supporting said drive unit on said auxiliary frame means, second elastic means for elastically supporting said auxiliary frame means at said vehicle superstructure in four points of which two points each are located in essentially transversely extending planes spaced in the longitudinal direction of the vehicle and with respective points in the two planes also offset with respect to each other in the transverse direction so as to provide a four point elastic support of which two points located to one side of the vehicle are offset in both the longitudinal and transverse direction with respect to each other, wheel suspension means for the vehicle wheels including guide means pivotally secured on said auxiliary frame means to enable up and down movement of the wheels thereon, the points of pivotal connection of said guide means at said auxiliary frame means being disposed intermediate said two essentially transversely extending planes and being effectively displaced with respect to the corresponding pivotal connections thereof at the wheels in the same vehicle longitudinal direction, and essentially transversely extending drive means drivingly connecting said axle gear means with the wheels supported on said wheel suspension means on opposite sides of the vehicle, and one end of said drive unit being supported on said auxiliary frame means on one side of the pivotal connection of the wheel guide means opposite a pair of the four points of said second elastic means disposed in one of said essentially transversely extending planes so that the weight of the drive unit on said auxiliary frame means is operable to counteract such forces as would produce oppositely directed moments.

10. In a motor vehicle the combination comprising a vehicle superstructure, auxiliary frame means including at least one essentially transversely extending portion connecting two angularly disposed portions, a drive unit including an internal combustion engine, first elastic means for elastically supporting said drive unit at said auxiliary frame means in a plurality of places, second elastic means for elastically supporting said auxiliary frame means at said vehicle superstructure in four points of which two points each are located in essentially transversely extending planes spaced in the longitudinal direction of the vehicle so as to provide a four point support of which the two points in the two planes located on the same side of the vehicle are offset in both the longitudinal and transverse direction with respect to each other, wheel suspension means including guide means pivotally secured on said auxiliary frame means substantially within the area thereof of said two essentially transversely extending planes to enable up and down movement of the wheels suspended by said wheel suspension means, and spring means cooperating with respective guide means for spring supporting the same against said auxiliary frame means, the four points of said second elastic support means elastically supporting said auxiliary frame means on said vehicle superstructure defining essentially a plane which extends downwardly in the longitudinal direction of the vehicle, and one end of said drive unit being supported on said auxiliary frame means on one side of the pivotal connection of the wheel guide means opposite a pair of the four points of said second elastic means located in one of said essentially transversely extending planes so that the weight of the drive unit on said auxiliary frame means is operable to counteract such forces as would produce oppositely directed moments.

11. In a motor vehicle the combination comprising a vehicle superstructure, auxiliary frame means including at least one essentially transversely extending portion connecting two angularly disposed portions, a drive unit including an internal combustion engine, change speed gear means and axle gear means, first elastic means for elastically supporting said drive unit on said auxiliary frame means, second elastic means for elastically supporting said auxiliary frame means at said vehicle superstructure in four points of which two points each are located in essentially transversely extending planes spaced in the longitudinal direction of the vehicle and with respective points in the two planes also offset with respect to each other in the transverse direction so as to provide a four point elastic support of which two points located to one side of the vehicle are offset in both the longitudinal and transverse direction with respect to each other, wheel suspension means for the vehicle wheels including guide means pivotally secured on said auxiliary frame means to enable up and down movement of the wheels thereon, the points of pivotal connections of said guide means at said auxiliary frame means being effectively displaced with respect to the corresponding pivotal connections thereof at the wheels in the same vehicle longitudinal direction, and essentially transversely extending drive means drivingly connecting said axle gear means with the wheels supported on said wheel suspension means on opposite sides of the vehicle, the four points of said second elastic support means elastically supporting said auxiliary frame means at said vehicle superstructure defining essentially a plane which extends downwardly in the longitudinal direction towards the vehicle center, and one end of said drive unit being supported on said auxiliary frame means on one side of the pivotal connection of the wheel guide means opposite a pair of the four points of said second elastic means located in one of said essentially transversely extending planes so that the weight of the drive unit on said auxiliary frame means is operable to counteract such forces as would produce oppositely directed moments.

12. In a motor vehicle the combination comprising axle gear means, a vehicle superstructure, auxiliary frame means including at least one essentially transversely extending portion connecting two angularly disposed portions, a drive unit including an internal combustion engine, first elastic means for elastically supporting said drive unit at said auxiliary frame means in several places, second elastic means for elastically supporting said auxiliary frame means at said vehicle superstructure in four points of which two points each are located on a respective side of the center longitudinal plane of the vehicle and are displaced with respect to each other in the longitudinal, vertical and transverse directions of the vehicle, at least some of said first elastic means being located within the area limited by vertical transverse planes extending through oppositely disposed points of said second elastic means, wheel suspension means including guide means pivotally secured on said auxiliary frame means to enable up and down movement of the wheels suspended by said wheel suspension means, and spring means cooperating with a respective guide means for spring supporting the same against said auxiliary frame means, and drive means drivingly connecting said axle gear means with the wheels supported on opposite sides of the vehicle on said wheel suspension means, the four elastic support means elastically supporting said auxiliary frame means on said vehicle superstructure defining essentially a plane which extends downwardly in the longitudinal direction toward the vehicle center, and one end of said drive unit being supported on said auxiliary frame means on one side of the pivotal connection of the wheel guide means opposite some of said second elastic means so that the weight of the drive unit on said auxiliary frame means is operable to counteract such forces as would produce oppositely directed moments.

13. In a motor vehicle the combination comprising a vehicle superstructure, auxiliary frame means, a drive unit, first elastic means for elastically supporting said drive unit at said auxiliary frame means in a plurality of places, second elastic means for elastically supporting said auxiliary frame means at said vehicle superstructure in two points disposed in an essentially transversely extending vertical plane and spaced relatively far from each other in the vehicle transverse direction and in two further points disposed in another essentially transversely extending plane spaced from said first mentioned plane in the vehicle longitudinal direction, said two further points being spaced in the transverse direction relatively closer to each other than said first-mentioned two points, and wheel suspension means including transversely extending glide means pivotally secured on said auxiliary frame means to enable up and down movement of the wheels suspended by said wheel suspension means, and one end of said drive unit being supported on said auxiliary frame means on one side of the pivotal connection of the wheel guide means opposite two of said points disposed in one of said essentially transversely extending vertical planes so that the weight of the drive unit on the auxiliary frame means is operable to counteract such forces as would produce oppositely directed moments.

14. In a motor vehicle the combination comprising a vehicle superstructure, auxiliary frame means, a drive unit, first elastic means for elastically supporting said drive unit at said auxiliary frame means in a plurality of places, second elastic means for elastically supporting said auxiliary frame means at said vehicle superstructure in two points disposed in an essentially transversely extending vertical plane and spaced relatively far from each other in the vehicle transverse direction and in two further points disposed in another essentially transversely extending plane spaced from said first-mentioned plane in the vehicle longitudinal direction, said two further points being spaced in the transverse direction relatively closer to each other than said first-mentioned two points, a plane passing through said four points having a downward inclination toward the center of the vehicle in the vehicle longitudinal direction, and wheel suspension means including transversely extending guide means pivotally secured on said auxiliary frame means to enable up and down movement of the wheels suspended by said wheel suspension means, and one end of said drive unit being supported on said auxiliary frame means on one side of the pivotal connection of the wheel guide means opposite two points disposed in one of said essentially transversely extending vertical planes so that the weight of the drive unit on said auxiliary frame means is operable to counteract such forces as would produce oppositely directed moments.

15. In a motor vehicle the combination comprising a vehicle superstructure, auxiliary frame means, a drive unit, first elastic means for elastically supporting said drive unit at said auxiliary frame means in several places, second elastic means for elastically supporting said auxiliary frame means at said vehicle superstructure in a plurality of points essentially defining an inclined plane extending downwardly in the vehicle longitudinal direction toward the center of the vehicle, said second elastic means being disposed at least with some of its members relatively higher than said first elastic means, two of said points being disposed in an essentially transversely extending vertical plane at relatively great distance from each other in the transverse direction to thereby provide a relatively wide support base, and wheel suspension means including essentially transversely extending guide means pivotally secured on said auxiliary frame means to enable up and down movement of the wheels mounted thereon, the relatively higher second elastic means being located within a vertical transverse plane of the vehicle which is located within the area of the wheels mounted on said wheel suspension means, and one end of said drive unit being supported on said auxiliary frame means on one side of the pivotal connection of the wheel guide means opposite two of said points disposed in one of said essentially transversely extending vertical planes so that the weight of the drive unit on said auxiliary frame means is operable to counteract such forces as would produce oppositely directed moments.

16. In a motor vehicle the combination according to claim 15 wherein said last-mentioned vertical transverse plane essentially coincides with said essentially transversely extending vertical plane in which said two first-mentioned points are disposed.

17. In a motor vehicle the combination comprising a vehicle superstructure, auxiliary frame means, a drive unit, first elastic means for elastically supporting said drive unit at said auxiliary frame means in a plurality of places, second elastic means for elastically supporting said auxiliary frame means at said vehicle superstructure in two points disposed in an essentially transversely extending vertical plane and spaced relatively far from each other in the vehicle transverse direction and in two further points disposed in another essentially transversely extending plane spaced from said first mentioned plane in the vehicle longitudinal direction, said two further points being spaced in the transverse direction relatively closer to each other than said first-mentioned two points, a plane passing through said four points having a downward inclination toward the center of the vehicle in the vehicle longitudinal direction, and wheel suspension means including transversely extending guide means pivotally secured on said auxiliary frame means to enable up and down movement of the wheels suspended by said wheel suspension means, said first and second elastic support means effectively providing a double elastic support of said drive unit with respect to said superstructure near the end of said drive unit facing the center of the vehicle to thereby minimize the transmission of vibrations from said drive unit to said passenger space, and one end of said drive unit being supported on said auxiliary frame means on one side of the pivotal connection of the wheel guide means opposite two of said point disposed in one of said essentially transversely extending planes so that the weight of the drive unit on said auxiliary frame means is operable to counteract such forces as would produce oppositely directed moments.

18. In a suspension system for a motor vehicle with road wheels the combination of a subframe for said vehicle, suspension means for said road wheels, means for attaching said suspension means to said subframe, a vehicle body, a plurality of pairs of resilient mounting means supporting one end of the vehicle body on said subframe, said pairs of mounting means being longitudinally spaced with respect to said vehicle body, one pair of said mounting means being attached to said auxiliary frame within a first transverse plane near the attachment of said suspension means to said subframe and another pair of said mounting means being located toward a transverse central vertical plane of the vehicle body, a power unit, means for resiliently supporting said power unit on said subframe including a plurality of longitudinally spaced mounting means located at the ends of said subframe, and one end of said power unit being supported on said subframe by some of said last-mentioned mounting means on the side of the suspension means opposite of said another pair of mounting means, so that the moment of the power unit on the one side of said suspension means counteracts the moment of the vehicle body on the other side thereof.

19. In a suspension system for a motor vehicle, with road wheels, the combination of a subframe for said vehicle, suspension means for said road wheels, means for pivotally connecting said suspension means to said subframe, a vehicle body, a plurality of pairs of resilient mounting means supporting one end of the vehicle body on said subframe, said pairs of mounting means being longitudinally spaced with respect to said vehicle body, a power unit, means for resiliently supporting said power unit on said subframe including a plurality of spaced mounting means, one end of said power unit being supported on said subframe by some of said last-mentioned mounting means on the one side of the pivotal connection of said suspension means opposite a pair of said first-mentioned mounting means so that the moment of the power unit on the one side of said suspension means counteracts the moment of the vehicle body on the other side.

20. In a motor vehicle having a vehicle body and two pairs of oppositely disposed wheels, an auxiliary frame separate from said vehicle body, drive means for driving a pair of said wheels, first elastic bearing means for elastically supporting said drive means on said auxiliary frame, suspension means for connecting one pair of said wheels to said auxiliary frame to provide an up and down movement of said wheels relative to said auxiliary frame including spring means for springing said wheels against said auxiliary frame, and second elastic bearing means for elastically fastening said auxiliary frame to said vehicle body in two transverse planes spaced in the longitudinal direction of the vehicle, said vehicle body, said drive means and said suspension means exerting forces on said auxiliary frame, and said first elastic bearing means being so located in relation to the second elastic bearing means and the connection of the suspension means on said auxiliary frame that the weight of said drive unit counteracts at least some of the other forces acting on said auxiliary frame as would produce on said auxiliary frame moments which are directed oppositely to the moment produced by the weight of said drive means.

References Cited in the file of this patent

UNITED STATES PATENTS

| | | |
|---|---|---|
| 1,829,251 | Whittington et al. | Oct. 27, 1931 |
| 1,948,744 | Curtiss | Feb. 27, 1934 |
| 1,948,745 | Curtiss | Feb. 27, 1934 |
| 1,959,113 | Sherman | May 15, 1934 |
| 2,022,111 | Evans | Nov. 26, 1935 |
| 2,065,665 | Dietrich | Dec. 29, 1936 |
| 2,139,750 | Hicks | Dec. 13, 1938 |
| 2,208,709 | Tjaarda | July 23, 1940 |
| 2,236,408 | Klavik | Mar. 25, 1941 |
| 2,254,282 | Griswold | Sept. 2, 1941 |
| 2,633,203 | Paton | Mar. 31, 1953 |

FOREIGN PATENTS

| | | |
|---|---|---|
| 245,565 | Switzerland | Nov. 17, 1947 |